United States Patent
Li et al.

(10) Patent No.: US 12,124,101 B2
(45) Date of Patent: Oct. 22, 2024

(54) LENS BASE WITH IMPROVED STRENGTH AND REDUCED SIZE, CAMERA MODULE AND ELECTRONIC DEVICES HAVING THE SAME

(71) Applicant: TRIPLE WIN TECHNOLOGY(SHENZHEN) CO. LTD., Shenzhen (CN)

(72) Inventors: Yu-Shuai Li, Shenzhen (CN); Shin-Wen Chen, New Taipei (TW); Jing-Wei Li, Guangdong (CN); Jian-Chao Song, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 323 days.

(21) Appl. No.: 17/719,515

(22) Filed: Apr. 13, 2022

(65) Prior Publication Data

US 2023/0065258 A1    Mar. 2, 2023

(30) Foreign Application Priority Data

Aug. 24, 2021    (CN) .......................... 202110977352.2

(51) Int. Cl.
| | |
|---|---|
| *H04N 5/335* | (2011.01) |
| *G02B 7/02* | (2021.01) |
| *G03B 30/00* | (2021.01) |
| *H04N 23/55* | (2023.01) |

(52) U.S. Cl.
CPC ............. *G02B 7/021* (2013.01); *G03B 30/00* (2021.01); *H04N 23/55* (2023.01)

(58) Field of Classification Search
CPC ....................................................... G03B 17/12
See application file for complete search history.

(56) References Cited

U.S. PATENT DOCUMENTS

| | | | |
|---|---|---|---|
| 7,525,096 B2 * | 4/2009 | Nakajo ............... | G06F 21/6209 |
| | | | 250/370.08 |
| 8,107,811 B1 * | 1/2012 | Ma .......................... | H04N 23/57 |
| | | | 396/535 |
| 8,259,223 B2 * | 9/2012 | Okada ..................... | H04N 23/55 |
| | | | 348/373 |
| 8,491,126 B2 * | 7/2013 | Ko .......................... | G03B 21/16 |
| | | | 353/100 |
| 8,565,592 B2 * | 10/2013 | Toor ........................ | G03B 17/12 |
| | | | 396/144 |
| 10,268,018 B1 * | 4/2019 | Ding ........................ | G02B 7/028 |
| 10,274,812 B1 * | 4/2019 | Chen ........................ | H04N 23/55 |
| 2005/0248684 A1 * | 11/2005 | Machida ................. | G03B 17/00 |
| | | | 396/533 |
| 2017/0244872 A1 * | 8/2017 | Wang ...................... | H05K 1/181 |

FOREIGN PATENT DOCUMENTS

CN            107544108 B       12/2020

* cited by examiner

*Primary Examiner* — Gary C Vieaux
(74) *Attorney, Agent, or Firm* — ScienBiziP, P.C.

(57) ABSTRACT

A lens base with improved strength and reduced size includes a bracket and a lens holder connected to the bracket. The bracket includes a cover plate and a side plate, the side plate connects to the cover plate to form a receiving groove, the cover plate defines a first aperture, the first aperture penetrates the cover plate. The lens holder faces away from the receiving groove, the lens holder defines a second aperture, the second aperture faces the first aperture.

14 Claims, 8 Drawing Sheets

LENS BASE WITH IMPROVED STRENGTH AND REDUCED SIZE, CAMERA MODULE AND ELECTRONIC DEVICES HAVING THE SAME

FIELD

The subject matter herein generally relates to imaging devices, and more particularly, to a lens base with improved strength and reduced size, a camera module having the lens base, and an electronic devices having the camera module.

BACKGROUND

A camera of a mobile phone includes a lens assembly, a lens base, and a circuit board. The lens assembly is connected to one side of the lens base, and the circuit board is bonded to the other side of the lens base. However, since the lens base is made up of plastics, the size of the lens base needs to increase to meet strength requirement, which is not conducive to the miniaturization of the mobile phone.

BRIEF DESCRIPTION OF THE DRAWINGS

Implementations of the present technology will now be described, by way of example only, with reference to the attached figures.

DETAILED DESCRIPTION

Figure 1:
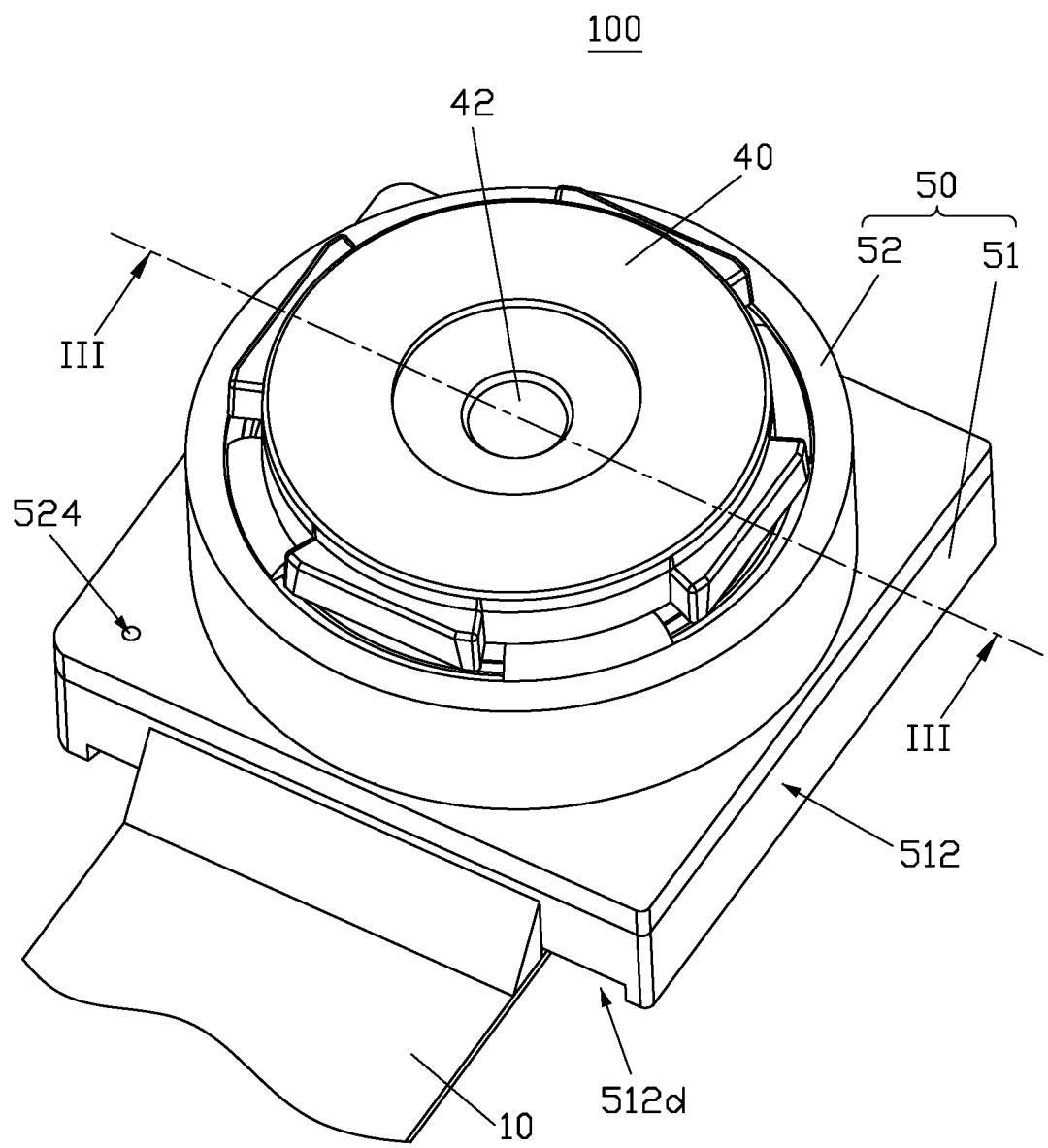
FIG. 1 is a diagrammatic view of a camera module according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
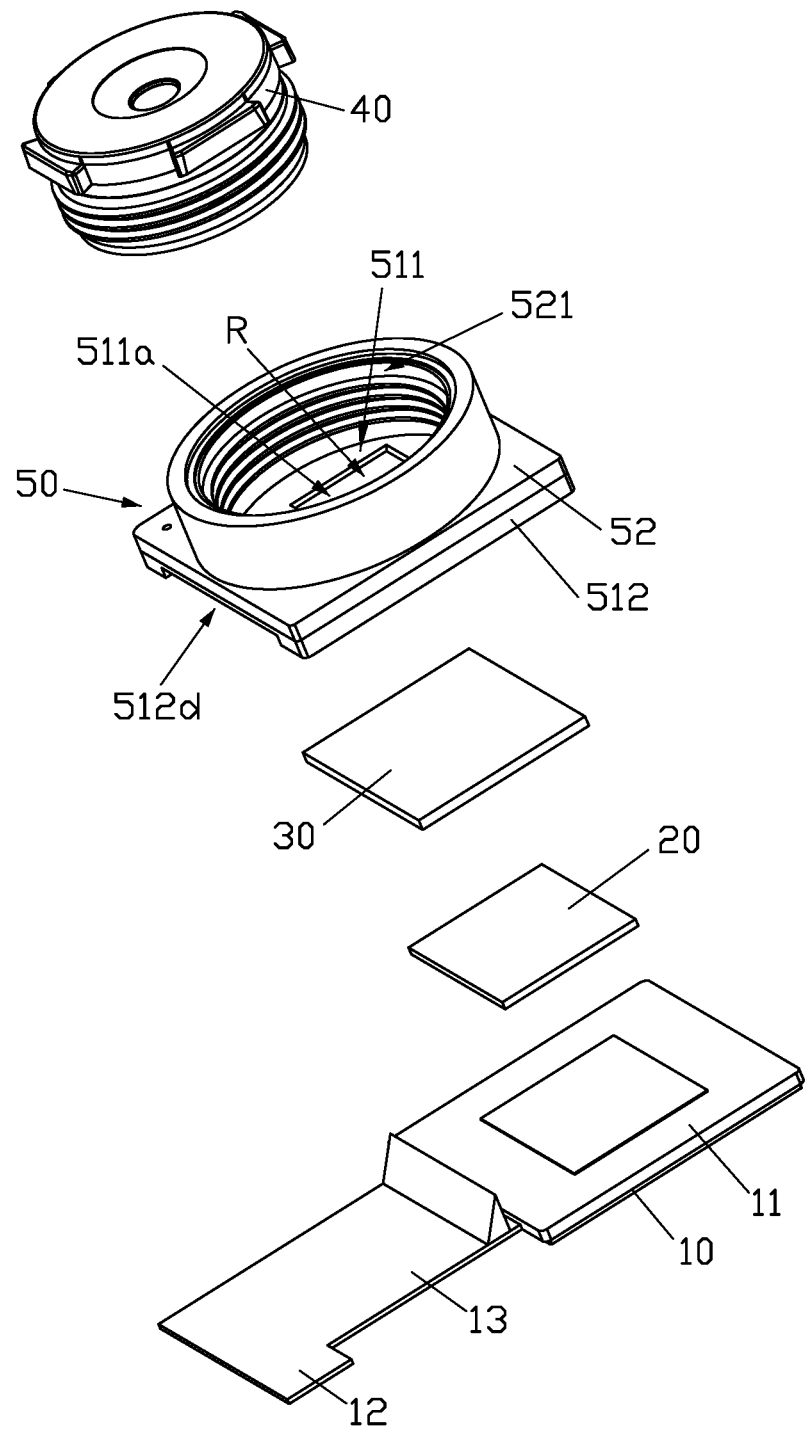
FIG. 2 is an exploded view of camera module of FIG. 1.

Referring to FIGS. 1 and 2, an embodiment of a camera module 100 is provided. The camera module 100 includes a circuit board 10, a sensor 20, an optical filter 30, a lens assembly 40, and a lens base 50. The lens base 50 includes a bracket 51 and a lens holder 52 connects to the bracket 51. The bracket 51 is made of metal. The bracket 51 includes a cover plate 511 and a plurality of side plates 512. The side plates 512 are connect to the cover plate 511 to form a receiving groove R. The cover plate 511 defines a first aperture 511a, and the first aperture 511a penetrates opposite sides of the cover plate 511. The lens holder 52 is connects to a side of the cover plate 511 away from the receiving groove R. An orthogonal projection of the lens holder 52 onto a plane of the cover plate 511 is within the cover plate 511. The lens holder 52 defines a second aperture 521 connected to the first aperture 511a, and the lens assembly 40 is arranged within the second aperture 521. The optical filer 30, the sensor 20, and a portion of the circuit board 10 are arranged within the receiving groove R.

Referring to FIGS. 1 and 2, the optical filter 30 is arranged on another side of the cover plate 511 away from the lens holder 52. The optical filter 30 covers the first aperture 511a. A side of the sensor 20 faces the first aperture 511a, and another side of the sensor 20 electronically connects to the circuit board 10.

When an objected (not shown) reflects light to the camera module 100, the reflected light travels along a direction from the lens assembly 40 to the optical filter 30, filtered by the optical filter 30, and reaches the sensor 20. The sensor 20 receives the light and transfers the light into an electrical signal. The circuit board 10 processes the electrical signal to a digital signal.

Figure 3:
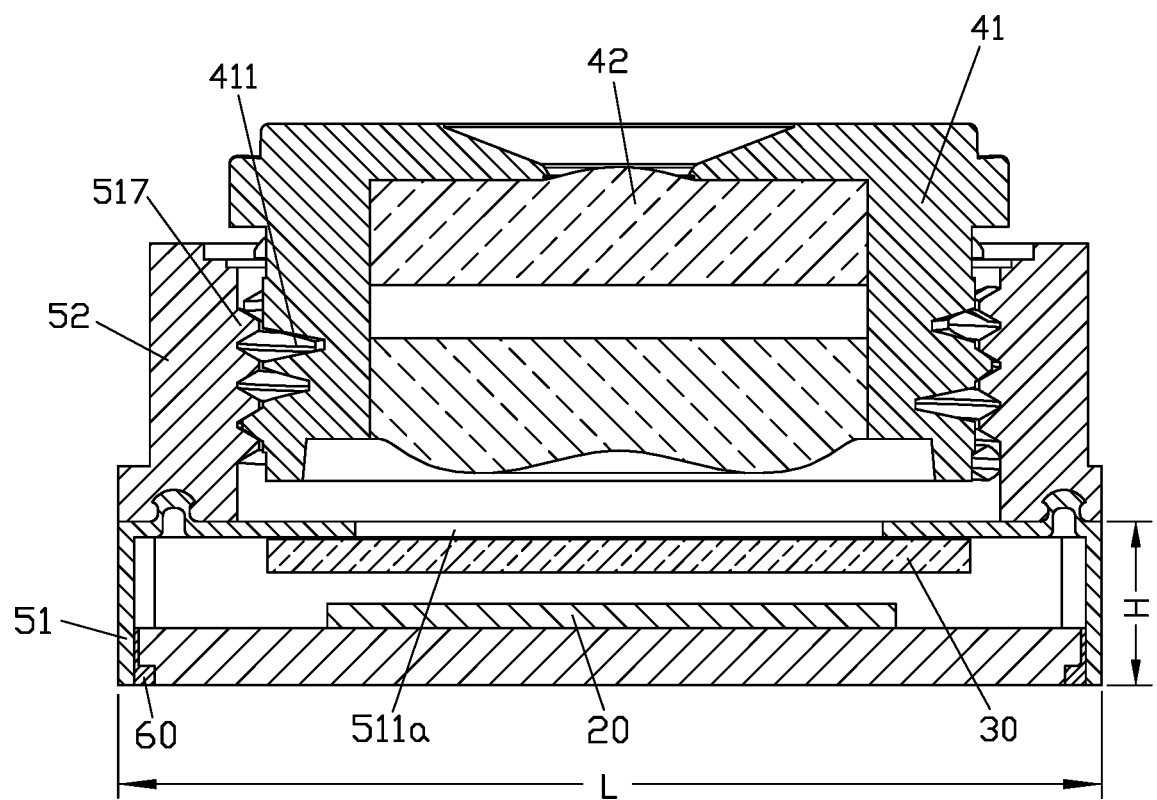
FIG. 3 a cross-sectional view along a view line III-III of FIG. 1.

Referring to FIG. 3, the bracket 51 made of metal has an improved strength compared with that of plastic, which is conducive to reduce a length L, a width W, or a height H of the bracket 51. Thus, the size of the cameral module 100 is reduced. In addition, the metal bracket 51 dissipate heat generated by the sensor 20 and the circuit board 10 to an outside environment, thereby increasing a service life of the camera module 100. Moreover, the metal bracket 51 has an electromagnetic shielding function, thus reducing interference of external electromagnetic signals to the circuit board 10 or to the sensor 20.

Figure 4:
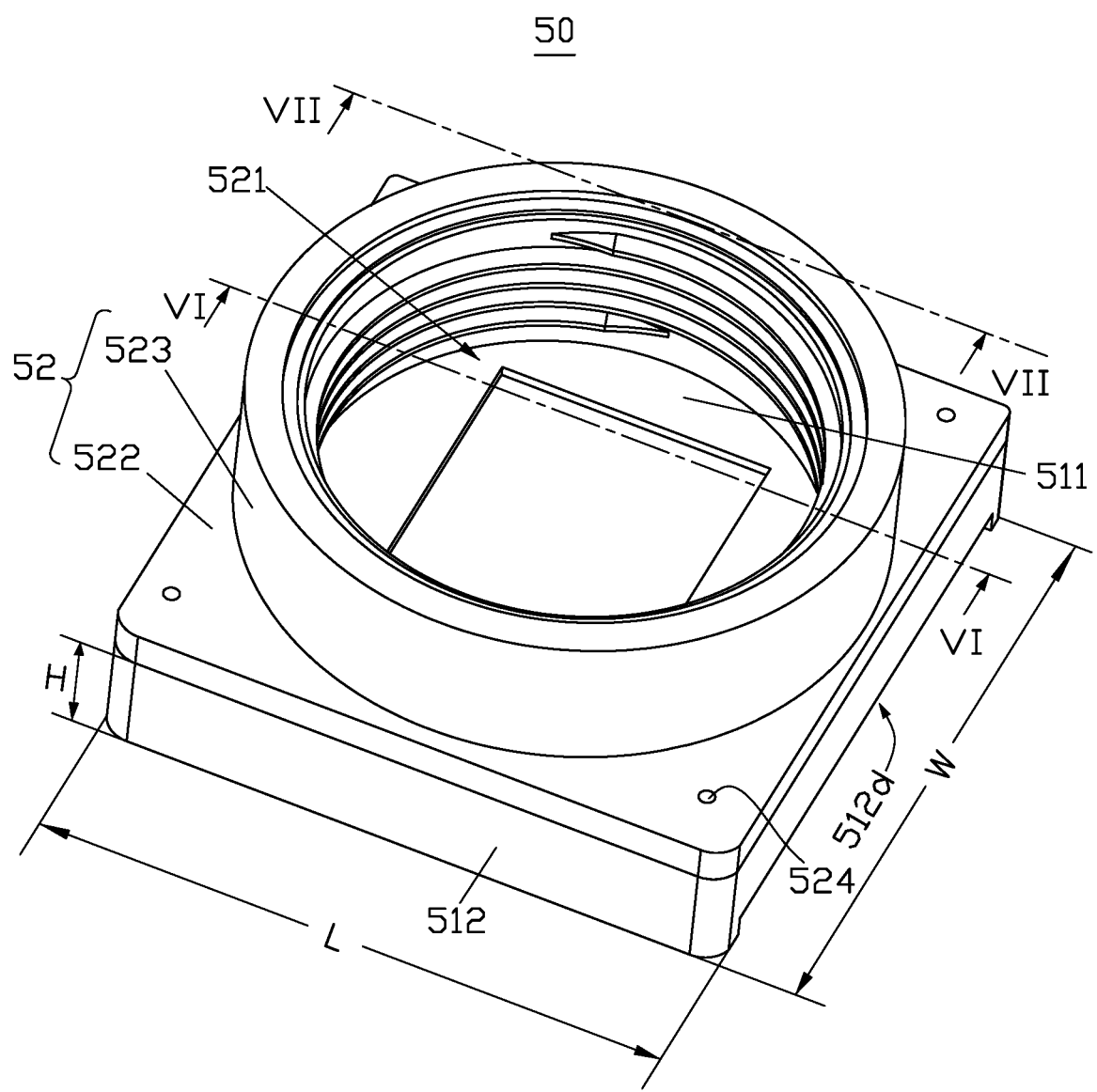
FIG. 4 is a diagrammatic view of a lens base of the camera module of FIG. 1.
Figure 5:
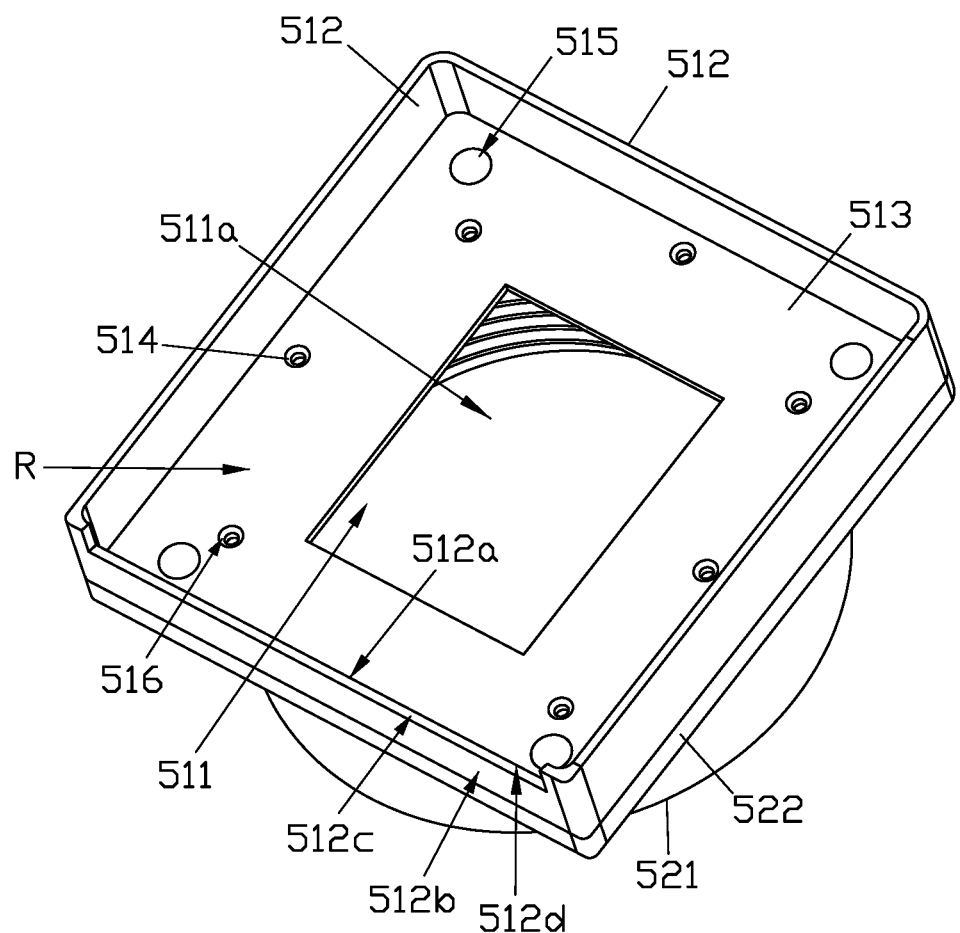
FIG. 5 is similar to FIG. 4, but showing the lens base from another angle.
Figure 6:
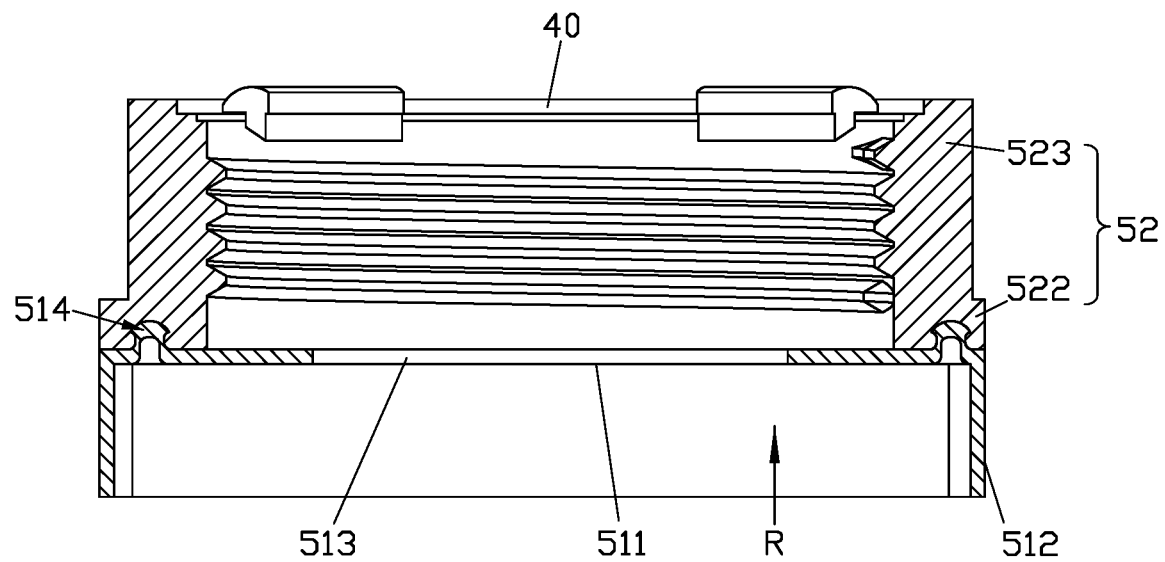
FIG. 6 is a cross-sectional view along a view line VI-VI of FIG. 4.

Referring to FIGS. 4, 5 and 6, in this embodiment, the cover plate 511 includes a plate body 511 and a plurality of bulges 514, and the bulges 514 are arranged on a side of the plate body 511 away from the receiving groove R. The lens holder 52 includes a bottom plate 522 and a circular wall 523, and the circular wall 523 connects the bottom plate 522 to form the second aperture 521. The circular wall 523 extends along a direction away from the second aperture 521 to form the bottom plate 522. The bottom plate 522 is arranged on the cover plate 511, and the bulges 514 is inserted into the circular wall 523 to increase a bonding strength between the bracket 51 and the lens holder 52.

Figure 7:
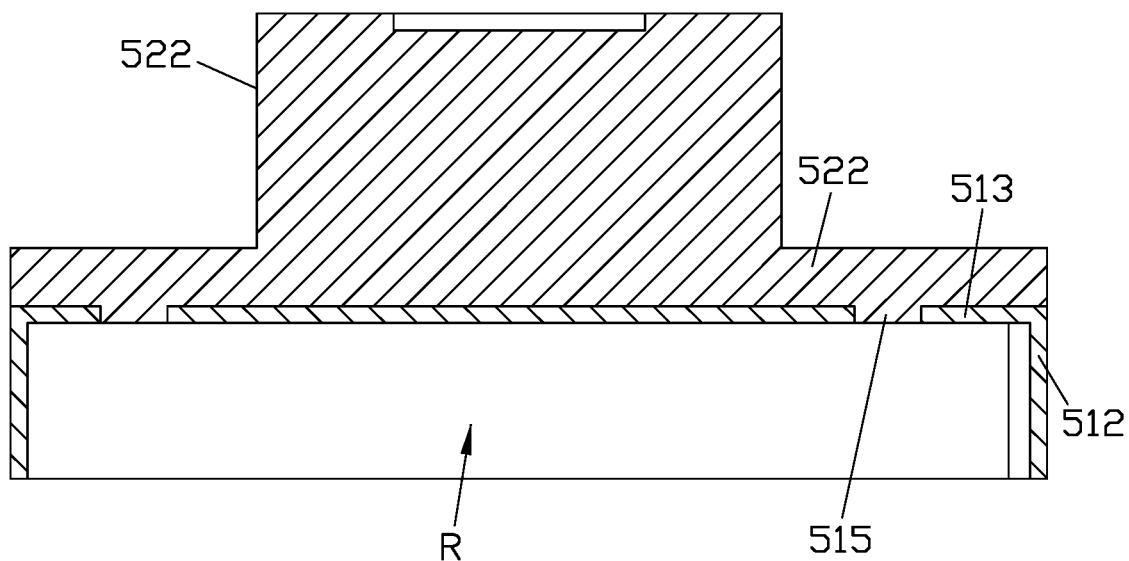
FIG. 7 is a cross-sectional view along a view line VII-VII of FIG. 4.

Referring to FIGS. 5 and 7, in this embodiment, the plate body 511 defines a plurality of through holes 515. The bottom plate 522 is partially filled into the through hole 515, to further increase the bonding strength between the bracket 51 and the lens holder 52.

Referring to FIGS. 1 and 7, in this embodiment, the plate body 511 further defines a plurality of first air escaping holes 516. Each first air escaping hole 516 penetrates opposite sides of the plate body 511. The first air escaping hole 516 communicates with the receiving groove R. The bottom plate 522 defines a plurality of second air escaping holes 524. Each second escaping holes 524 penetrates opposite sides of the bottom plate 522. The first air escaping hole 516 faces the second air escaping hole 524. Water vapor inside the receiving groove R can flow to the ambient environment through the first air escaping hole 516 and the second air escaping hole 524, thereby reducing an adverse effects of the water vapor on the sensor 20.

Referring to FIG. 5, in this embodiment, the side plate 512 includes an inner surface 512a, an outer surface 512b, and a connecting surface 512c. The connecting surface 512c connects the inner surface 512a and the outer surface 512b. The inner surface 512a faces the receiving groove R, and the connecting surface 512c is opposite to the cover plate 511. The connecting surface 512c is concaved to form an opening 512d, and the opening 512d penetrates the inner surface 512a and the outer surface 512b. A portion of the circuit board 10 extends from the receiving groove R through the opening 512d. Specifically, referring to FIG. 2, the circuit board 10 includes a first part 11, a second part 12, and a connecting part 13. The connecting part 13 connects the first part 11 and the second part 12. The first part 11 is arranged within the receiving groove R, the connecting part 13 goes through the opening gap 512d, and the second part 12 is arranged outside the receiving groove R.

In this embodiment, the lens holder 52 is made of plastic, and the lens holder 52 and the bracket 51 are integrally formed by insert molding.

Referring to FIG. 2, in this embodiment, the lens assembly 40 includes a shell 41 and a plurality of optical lenses 42, each of the optical lenses 42 is arranged within the shell 41. The shell 41 defines a plurality of outer threads 411. A plurality of inner threads 517 is arranged within the second aperture 521. The outer threads 411 are engaged with the inner threads 517 to make the lens assembly 40 detachably connected to the lens holder 52.

Referring to FIGS. 2 and 3, in this embodiment, the camera module 100 further includes an adhesive film 60. The adhesive film 60 is arranged between the first part 11 and the side plate 512, and also fills a gap between the bracket 51 and the circuit board 10 to seal the receiving groove R.

Figure 8:
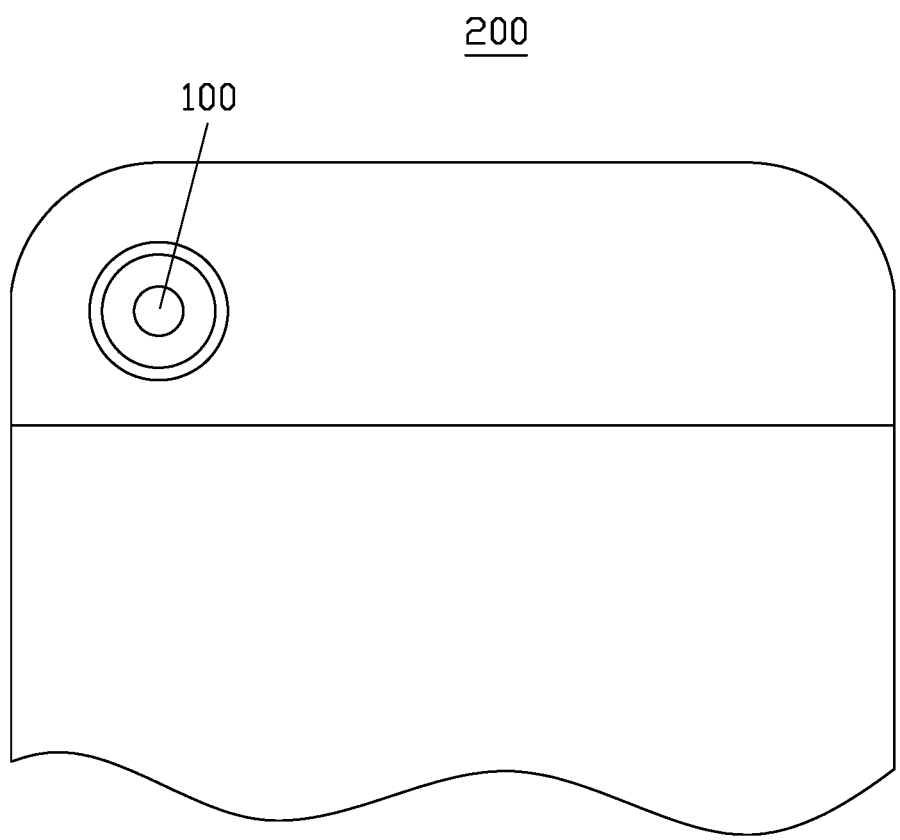
FIG. 8 is a diagrammatic view of a mobile phone according to an embodiment of the present disclosure.

Referring to FIG. 8, an embodiment of a mobile phone 200 is provided. The mobile phone 200 includes the camera module 100. In other embodiment, the camera module 100 can be arranged to electronic devices such as computer or smart phone.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A lens base comprising:
   a bracket made of metal; and
   a lens holder connected to the bracket,
   wherein the bracket comprises a cover plate and a side plate, the side plate connects to the cover plate to form a receiving groove, the cover plate defines a first aperture, the first aperture penetrates the cover plate;
   wherein the lens holder faces away from the receiving groove, the lens holder defines a second aperture, the second aperture faces the first aperture;
   wherein the cover plate comprises a plate body and a plurality of bulges arranged on the plate body, the plurality of bulges faces away from receiving groove, the lens holder comprises a bottom plate and a circular wall, the circular wall connects the bottom plate to form the second aperture, the bottom plate is arranged to the plate body, the plurality of bulges is inserted into the circular wall.

2. The lens base of claim 1, wherein the plate body defines a plurality of through holes, the bottom plate is partially filled into the through hole.

3. The lens base of claim 1, wherein the plate body further defines a plurality of first air escaping holes, the plurality of first air escaping holes connects to the receiving groove, the bottom plate defines a plurality of second air escaping holes, the plurality of second air escaping holes connects the plurality of first air escaping holes.

4. The lens base of claim 1, wherein the circular wall comprises an inner surface, an outer surface, and a connecting surface, the inner surface is opposite to the outer surface, the inner surface faces the receiving groove, the connecting surface connects the inner surface and the outer surface, the connecting surface faces away from the cover plate, the connecting surface defines an opening, the opening penetrates the inner surface and the outer surface.

5. The lens base of claim 1, wherein the lens holder made up of plastic, the lens holder and the bracket are integrally formed.

6. A camera module comprising:
   a circuit board;
   a sensor;
   an optical filter;
   a lens assembly; and
   a lens base;
   a bracket made of metal; and
   a lens holder connected to the bracket,
   wherein the bracket comprises a cover plate and a side plate, the side plate connects to the cover plate to form a receiving groove, the cover plate defines a first aperture, the first aperture penetrates the cover plate;
   wherein the lens holder faces away from the receiving groove, the lens holder defines a second aperture, the second aperture faces the first aperture;
   wherein the lens assembly is arranged within the second aperture, the optical filter covers the first aperture, a portion of circuit board is arranged in the receiving groove, the sensor connects to the circuit board and faces the lens assembly;
   wherein the cover plate comprises a plate body and a plurality of bulges arranged on the plate body, the plurality of bulges faces away from receiving groove, the lens holder comprises a bottom plate and a circular wall, the circular wall connects the bottom plate to form the second aperture, the bottom plate is arranged to the plate body, the plurality of bulges is inserted into the circular wall.

7. The camera module of claim 6, wherein the lens assembly comprises a shell and a plurality of optical lens, the plurality of optical lens is arranged in the shell, a plurality of outer threads is defined around the shell, a plurality of inner threads is defined within the second aperture, the plurality of outer threads is engaged with the plurality of inner threads.

8. The camera module of claim 6, further comprising an adhesive film arranged between the circuit board and the side plate.

9. The camera module of claim 6, wherein the plate body defines a plurality of through holes, partial of the bottom plate fills the plurality of through holes.

10. The camera module of claim 6, wherein the plate body further defines a plurality of first air escaping holes, the plurality of first air escaping holes connects to the receiving groove, the bottom plate defines a plurality of second air escaping holes, the plurality of second air escaping holes connects the plurality of first air escaping holes.

11. The camera module of claim 6, wherein the circular wall comprises an inner surface, an outer surface, and a connecting surface, the inner surface faces the outer surface, the inner surface faces the receiving groove, the connecting surface connects the inner surface and the outer surface, the connecting surface faces away from the cover plate, the connecting surface defines an opening gap, the opening gap penetrates the inner surface and the outer surface.

12. The camera module of claim 6, wherein the lens holder made up of plastic, the lens holder and the bracket are integrally formed.

13. An electronic device comprising
a camera module comprises
a circuit board;
a sensor;
an optical filter;
a lens assembly; and
a lens base;
a bracket made of metal; and
a lens holder connected to the bracket,
wherein the bracket comprises a cover plate and a side plate, the side plate connects to the cover plate to form a receiving groove, the cover plate defines a first aperture, the first aperture penetrates the cover plate;
wherein the lens holder faces away from the receiving groove, the lens holder defines a second aperture, the second aperture faces the first aperture;
wherein the lens assembly is arranged within the second aperture, the optical filter covers the first aperture, a portion of circuit board is arranged in the receiving groove, the sensor connects to the circuit board and faces the lens assembly;
wherein the cover plate comprises a plate body and a plurality of bulges arranged on the plate body, the plurality of bulges faces away from receiving groove, the lens holder comprises a bottom plate and a circular wall, the circular wall connects the bottom plate to form the second aperture, the bottom plate is arranged to the plate body, the plurality of bulges is embedded inside the circular wall.

14. The electronic device of claim 13, wherein the camera module further comprises an adhesive film arranged between the circuit board and the side plate.

* * * * *